May 20, 1930.  W. G. WEHR  1,759,177
TRACTOR FOR OVERHEAD CARRIER SYSTEMS
Filed June 2, 1927   3 Sheets-Sheet 1
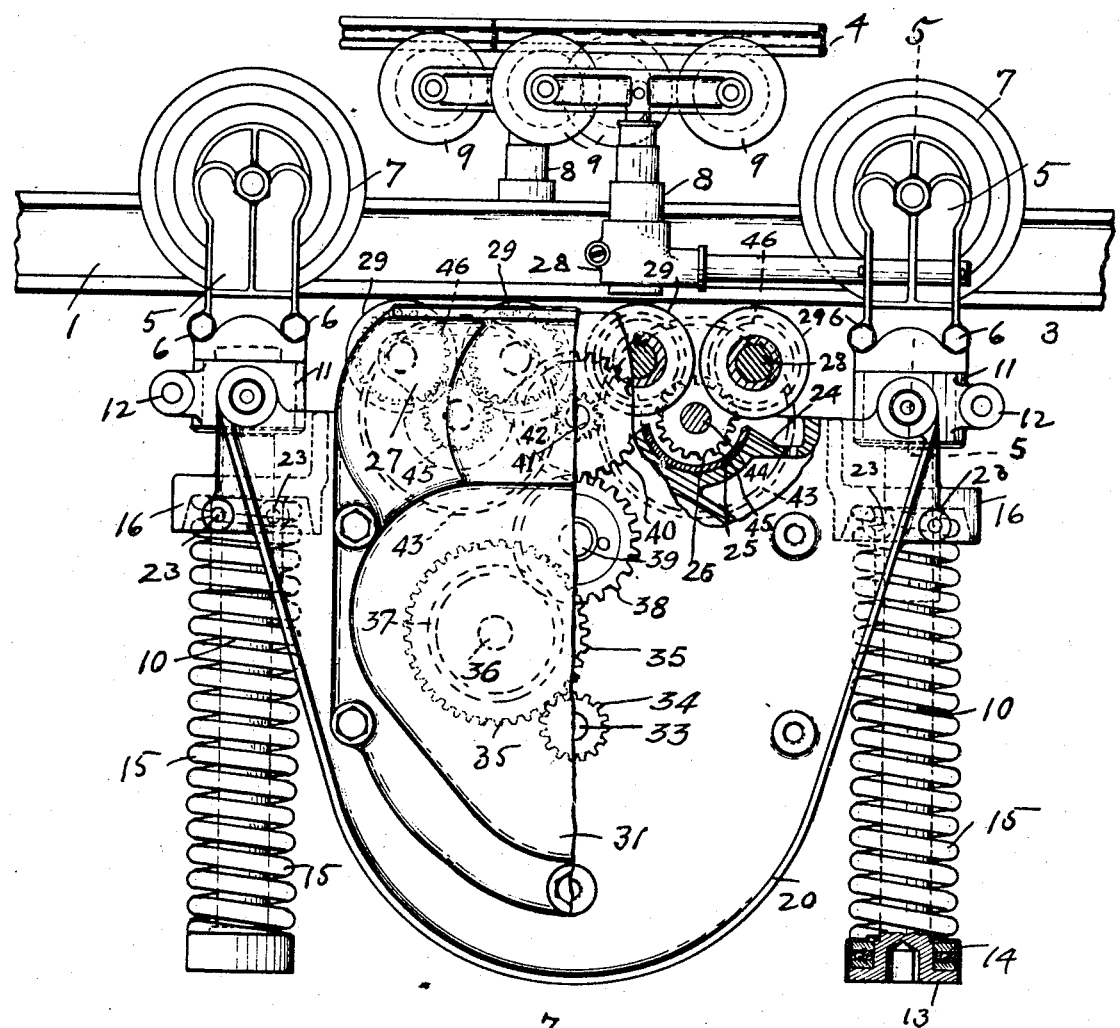
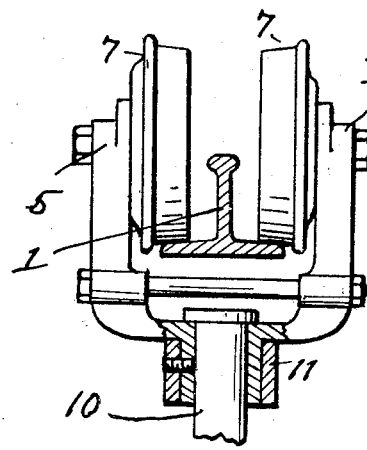

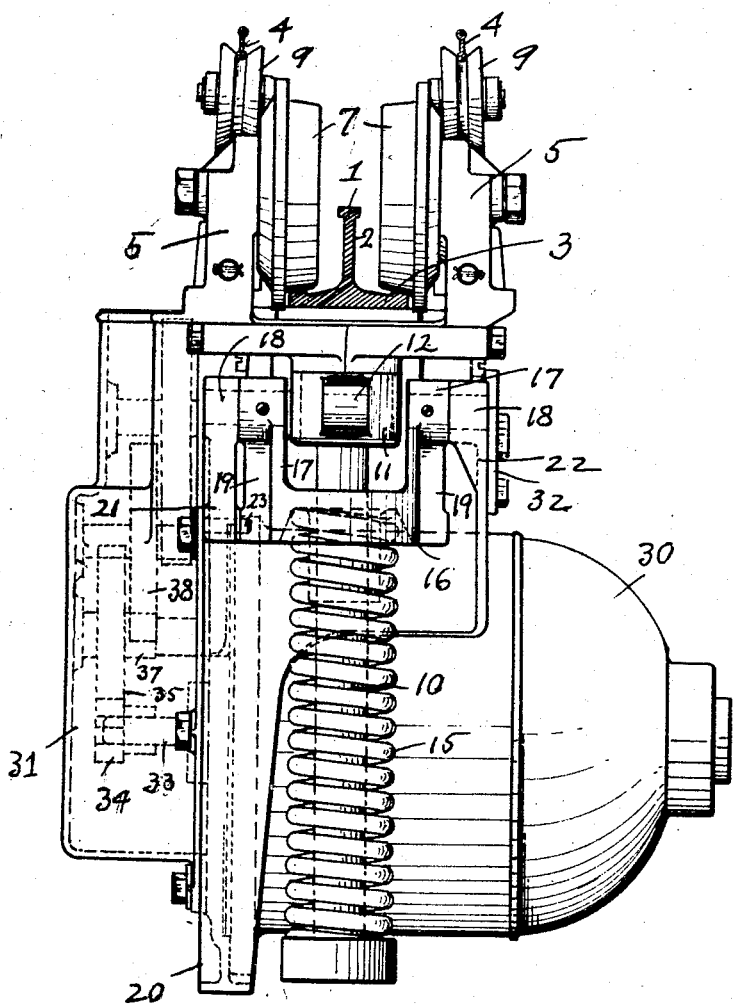

May 20, 1930. W. G. WEHR 1,759,177
TRACTOR FOR OVERHEAD CARRIER SYSTEMS
Filed June 2, 1927 3 Sheets-Sheet 3
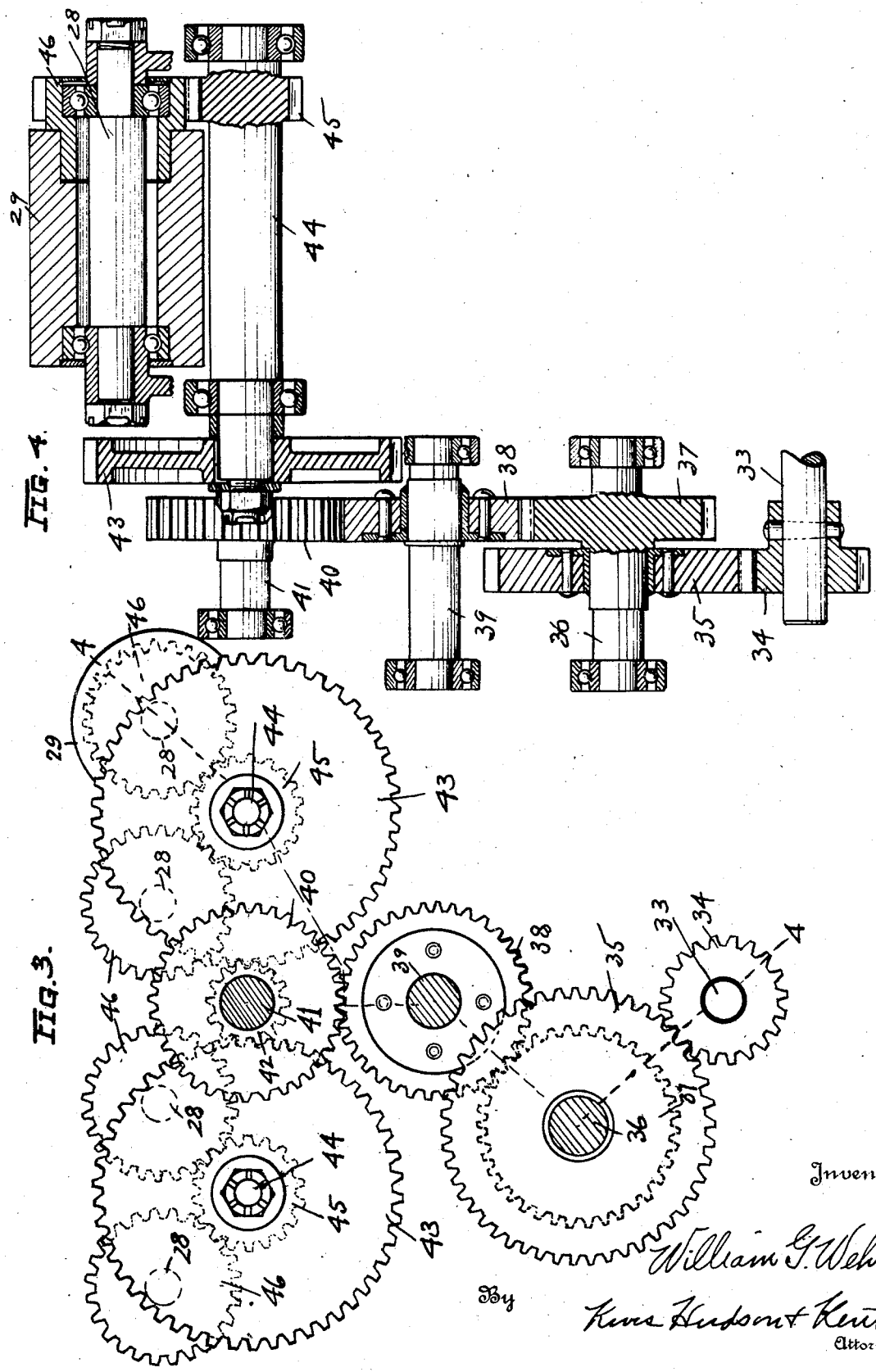

Patented May 20, 1930

1,759,177

UNITED STATES PATENT OFFICE

WILLIAM G. WEHR, OF EAST CLEVELAND, OHIO, ASSIGNOR TO THE CLEVELAND CRANE & ENGINEERING COMPANY, OF WICKLIFFE, OHIO, A CORPORATION OF OHIO

TRACTOR FOR OVERHEAD CARRIER SYSTEMS

Application filed June 2, 1927. Serial No. 196,125.

This invention relates to tractors for overhead carrier systems, and has for its object to provide a tractor adapted to travel on an overhead trackway and to push or pull a single load supporting carrier or a train of such carriers along the overhead trackway.

A further object is to provide a tractor in which means is provided for exerting a yielding pressure on a traction wheel to hold the same against the track rail to enable the tractor to exert an effective propelling force on the carriers being moved by the tractor along the overhead trackway.

A further object is to provide a tractor in which the pressure holding the traction wheel against the rail is greatly in excess of the weight of the tractor, whereby a relatively light tractor may be used for propelling heavy loads.

A further object is to provide a tractor capable of operating effectively in passing over irregularities in the track, around lateral curves, and in passing from horizontal to inclined portions of the track.

A further object is to provide a tractor with a traction wheel which has a wide bearing against the track rail to prevent slippage between the wheel and rail.

A further object is to provide a tractor having a traction wheel which bears against the bottom of the track rail and which is yieldingly pressed against the bottom of the rail to maintain an effective frictional engagement therewith.

With the above and other objects in view, the invention may be said to comprise the tractor as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 1 is a side elevation of a tractor embodying the invention, in which a portion of the gear housing is broken away to show the mounting of the traction wheels and the gearing for driving the same;

Fig. 2 is an end elevation of the tractor;

Fig. 3 is a side elevation of the gearing by which the traction wheels are driven from the motor shaft;

Fig. 4 is a section through the gearing on the broken line indicated at 4—4 in Fig. 3; and Fig. 5 is a section on line 5—5 of Fig. 1.

In the accompanying drawing, the invention is shown applied to a tractor for use on monorail carrier systems, the track 1 being in the form of a T-shaped rail having a web 2 to which the flexible suspension members are connected, and laterally projecting base flanges 3 upon which the carrier supporting wheels travel. Conductor rails 4 extend parallel with the track 1 and are preferably mounted above the same. The tractor has end trucks, each formed of two identical half sections 5 which are connected beneath the rail by means of bolts 6. Each of the trucks is provided with a pair of flanged wheels 7 which are journaled in the opposite sides of the truck frame and are adapted to travel upon the opposite flanges 3 of the rail. One of the trucks may have pivotally connected thereto a pair of conductor arms 8 which carry grooved wheels 9 which engage with the conductor rails 4 for conducting current to the tractor motor.

Rotatably mounted in each of the trucks and extending downwardly therefrom is a vertical pin 10, and secured on these pins immediately below the truck frames 5 are coupling collars 11 which have eyes 12 adapted to receive couplings for connecting the tractor to a load supporting carrier. Each of the pins 10 has at its lower end a supporting shoulder or head 13 upon which is mounted a rotatable thrust bearing 14 which supports a compression coil spring 15 surrounding the pin. Slidably and rotatably mounted on each of the pins 10, there is a sleeve 16 which is supported upon the upper end of the spring 15, and these sleeves are each provided with a pair of upwardly extending arms 17 which straddle the coupling collar 11 and carry outwardly projecting pivot pins or trunnions 18 which serve as supports for the tractor frame which will presently be described. The arms 17 are provided on their outer sides with vertical ribs 19 for a purpose which will presently be set forth.

The tractor frame 20 is substantially U-shaped and is provided at opposite ends with laterally spaced vertically disposed arms 21 and 22 which are adapted to straddle the sleeves 16 and are provided at their upper ends with bearing portions to receive the projecting pivot pins 18. The arm 21 is provided with spaced inwardly projecting pins 23 which lie upon opposite sides of the rib 19 of the adjacent arm of the sleeve 16 and serve to limit the pivotal movements of the frame 20 with respect to the supporting sleeves. The major portion of the frame 20 is in the plane of the arm 21, and the upper portion of the frame is laterally offset and carries the supporting arm 22, the laterally offset portion of the frame extending beneath the track 1 between the end trucks.

The laterally offset portion of the frame 20 is in the form of a continuous web 24, and this web is provided with longitudinally spaced transversely extending concave seats 25 of arcuate form which are adapted to receive the arcuate bases 26 of rocker supports 27, each of which carries at its upper end a pair of transverse shafts 28 disposed on opposite sides of the pivotal axis of the rocker support. Each of the shafts 28 carries a traction wheel 29 which bears against the bottom of the monorail track 1, the wheels 29 being cylindrical and of a width slightly greater than the width of the bottom of the rail so that the traction wheels bear against the bottom of the track throughout the width thereof. The pivots 18 upon which the tractor frame is mounted permit relative rocking movements between the end trucks and the frame about horizontal transverse axes, and since the sleeves 16 are free to turn on the pins 10, relative pivotal movement between the tractor frame and the end trucks about vertical axes is permitted.

The heavy coil springs 15 press the tractor frame upwardly toward the rail 1 so that a relatively heavy but yielding pressure is exerted upon the traction wheels 29 which bear against the bottom of the rail. The relative pivotal movements between the tractor frame and the end trucks permit the tractor to pass freely over irregularities in the supporting track, around lateral curves, and from horizontal to inclined portions of the track, and the rocking supports for the tractor wheels insure uniform pressure of the traction wheels against the bottom of the rail.

Means is provided on the tractor frame for driving the traction wheels 29 to propel the tractor along the trackway, the driving means consisting preferably of an electric motor 30 and suitable gearing for driving the traction wheels from the motor. The motor 30 is rigidly attached to the vertical side of the frame 20 which extends below the laterally offset portion of the frame and the gearing is enclosed within the housing plate 31 bolted to the vertically disposed side of the frame 20. The side of the frame 20 opposite to that to which the housing plate 31 is attached is provided above the motor 30 with a cover plate 32, the motor 30 projecting beneath the laterally offset portion of the frame and beyond the same so that its weight is so disposed as to bring the center of gravity of the tractor substantially beneath the center of the track.

The motor 30 has a shaft 33 to which is fixed a gear 34 which meshes with the gear 35 fixed to a shaft 36 journaled in the frame 20 above the shaft 33 and the shaft 36 has fixed thereto a gear 37 which meshes with a gear 38 fixed to a shaft 39 journaled in the frame above the shaft 36. The gear 38 meshes with the gear 40 which is fixed to a shaft 41 journaled in the frame 20 midway between the pivotal axes of the rocking supports 27 which carry the traction wheels. The shaft 41 has fixed thereto a second gear 42 which meshes with gears 43 of equal size which are fixed to shafts 44 which are journaled in the rocker frames 27 at the pivotal axes thereof. Each of the shafts 44 has fixed thereto a second gear 45 which meshes with two gears 46 which are of equal size and fixed to the two traction wheels on the rocking frame. Since the gears 43 turn about the pivotal axes of the rocking frames they remain in mesh with the driving gear 42 regardless of the pivotal movements of the rocking frames. The gears in the gear train connecting the motor shaft to the traction wheels may be readily replaced with the other sets of gears providing a different gear ratio between the motor shaft and traction wheels so that the tractor may be adapted for hauling heavy loads at comparatively low speed or for hauling lighter loads at higher speeds. Current is supplied to the motor by suitable connections (not shown) from the conductor arms 8 which receive current from the conductor rails 4, and the motor may be controlled either by the controllers through which current is supplied to the conductor rails or by controllers through which current is supplied from the conductor rails to the motor.

In the operation of the tractor the four traction wheels are held against the bottom of the rail with uniform pressure by the springs 15 so that all of the wheels have equal propelling effect, and since the traction wheels have a wide bearing on the track rail there is a high frictional resistance to slippage of a wheel on the rail and consequently a high percentage of the driving force applied to the rollers is effective for moving the tractor along the trackway. If there are irregularities in the track, due to the bends in the rail, the traction wheels will all be maintained in engagement with the bottom of the track by the action of the rocking supports 27.

In passing around lateral bends in the track the end trucks can swivel on the pins 10 and the traction wheels 29 by reason of the fact that they are wider than the bottom of the rail will remain in engagement with the rail substantially throughout the width thereof. In passing from horizontal to inclined portions of the track the end trucks can swivel on the pivot pins 18 to permit the pins 10 to assume the positions relative to the tractor frame toward which they are urged by the action of the springs 15 and the rocking supports 27 for the traction wheels will automatically swing to the positions toward which they are urged by the pressure on the traction wheels so that uniform pressure is maintained on the traction wheels.

Although a preferred embodiment of the invention has been disclosed and described herein, it should be understood that the invention is susceptible of various modifications and adaptations within the scope of the appended claims.

Having thus described my invention, I claim:

1. A tractor for overhead carrier systems having oppositely disposed wheels adapted to engage upper and lower surfaces of a rail flange, means for yieldably pressing the opposed wheels toward each other, and means for driving said wheels which engage the lower surface of the rail flange to propel the tractor along the rail.

2. A tractor for overhead carrier systems having longitudinally spaced supporting wheels adapted to travel on a rail flange, a wheel intermediate said supporting wheels adapted to bear against the bottom of the rail flange, means for yieldably pressing said last mentioned wheel in an upward direction, and means for driving said last mentioned wheel to propel the tractor along the rail.

3. A tractor for overhead carrier systems comprising a pair of longitudinally spaced trucks having wheels adapted to travel on a rail flange, a frame suspended from said trucks and having a wheel adapted to bear against the bottom of the rail flange between said trucks, springs interposed between said trucks and frame for pressing the frame upwardly, and means for driving certain of said wheels to propel the tractor along the rail.

4. A tractor for overhead carrier systems comprising a pair of longitudinally spaced trucks having wheels adapted to travel on a rail flange, a frame suspended from said trucks and having a wheel adapted to bear against the bottom of the rail flange between said trucks, springs interposed between said trucks and frame for pressing the frame upwardly, and means carried by the frame for driving said wheel carried by the frame to propel the tractor along the rail.

5. A tractor for overhead carrier systems comprising a pair of longitudinally spaced trucks having wheels adapted to travel on a rail, a frame suspended from said trucks and connected thereto to swivel about vertical and transverse axes and for bodily movement in a vertical direction, means interposed between the trucks and frame for pressing the frame upwardly, wheels carried by the frame and adapted to bear against the bottom of the rail, and means for driving certain of said wheels to propel the tractor along the track.

6. A tractor for overhead carrier systems comprising a pair of longitudinally spaced trucks having wheels adapted to travel on a rail, a frame suspended from said trucks and connected thereto to swivel about vertical and transverse axes and for bodily movement in a vertical direction, means interposed between the trucks and frame for pressing the frame upwardly, a member mounted on the frame to swing about a transverse axis, a pair of spaced wheels on said member adapted to engage the bottom of the rail, and means for driving certain of said wheels to propel the tractor along the track.

7. A tractor for overhead carrier systems having supporting wheels adapted to travel on a rail flange, a traction wheel of greater width than the bottom of the rail flange and adapted to bear against the bottom thereof, means for yieldably pressing the traction wheel against the bottom of the rail flange, and means for driving said traction wheel.

8. A tractor for overhead carrier systems having supporting wheels adapted to travel on a rail, a traction wheel of greater width than the bottom of the rail and adapted to bear against the bottom of the rail, means for suspending said traction wheel from said supporting wheels for swiveling movements in different directions and for movement bodily toward and from the supporting wheel, means for yieldably pressing said traction wheel against the bottom of the rail, and means for driving said traction wheel.

9. A tractor adapted to travel upon an overhead rail and comprising a pair of longitudinally spaced trucks having supporting wheels adapted to travel on the rail and vertical pins extending downwardly therefrom, each pin having a supporting shoulder at its lower end, a sleeve slidably and rotatably mounted on each pin, a compression coil spring on each pin interposed between the shoulder and sleeve, a frame pivotally connected to said sleeves, a wheel carried by said frame and adapted to bear against the bottom of the rail, and means for driving certain of said wheels.

10. A tractor adapted to travel upon an overhead rail and comprising a pair of longitudinally spaced trucks having supporting wheels adapted to travel on the rail and vertical pins extending downwardly therefrom, each pin having a supporting shoulder at its lower end, a sleeve slidably and rotatably mounted on each pin, a compression coil spring on each pin interposed between the shoulder and sleeve, a frame pivotally connected to said sleeves, a traction wheel carried by the frame and adapted to bear against the bottom of the rail, said wheel having a cylindrical periphery engageable with the bottom of the rail substantially throughout the width thereof, and means for driving said traction wheel.

11. A tractor adapted to travel upon an overhead rail and comprising a pair of longitudinally spaced trucks having supporting wheels adapted to travel on the rail and vertical pins extending downwardly therefrom, each pin having a supporting shoulder at its lower end, a sleeve slidably and rotatably mounted on each pin, a compression coil spring on each pin interposed between the shoulder and sleeve, a frame pivotally connected on said sleeves, a supporting member mounted on said frame to swing about a transverse horizontal axis, a pair of traction wheels on said member adapted to bear against the bottom of said rail, and means for driving said traction wheels.

12. A tractor adapted to travel upon an overhead rail and comprising a pair of longitudinally spaced trucks having supporting wheels adapted to travel on the rail and vertical pins extending downwardly therefrom, each pin having a supporting shoulder at its lower end, a sleeve slidably and rotatably mounted on each pin, a compression coil spring on each pin interposed between the shoulder and sleeve, a frame pivotally connected to said sleeves, a pair of supporting yokes mounted on said frame at longitudinally spaced points to swing about transverse horizontal axes, a pair of traction wheels on each yoke adapted to bear against the bottom of said rail, and means for driving said traction wheels.

13. A tractor adapted to travel upon an overhead rail and comprising a pair of longitudinally spaced trucks having supporting wheels adapted to travel on the rail and vertical pins extending downwardly therefrom, a sleeve slidably and rotatably mounted on each pin, a coil spring on each pin for supporting the sleeve thereon, a rotatable thrust bearing on each pin for supporting the lower end of the spring thereon, a frame connected to said sleeves by transverse pivots, traction wheels carried by said frame and engageable with the bottom of said rail, and means for driving said traction wheels.

14. A tractor adapted to travel upon an overhead rail and comprising a pair of longitudinally spaced trucks having supporting wheels adapted to travel on the rail and vertical pins extending downwardly therefrom, a sleeve slidably and rotatably mounted on each pin, a coil spring on each pin for supporting the sleeve thereon, a rotatable thrust bearing on each pin for supporting the lower end of the spring thereon, a frame connected to said sleeves by transverse pivots, coupling members swiveled on said pins above said sleeves, traction wheels carried by said frame and engageable with the bottom of said rail, and means for driving said traction wheels.

15. A tractor adapted to travel upon an overhead rail and comprising a pair of longitudinally spaced trucks having supporting wheels adapted to travel on the rail and vertical pins extending downwardly therefrom, a sleeve slidably and rotatably mounted on each pin, a coil spring on each pin for supporting the sleeve thereon, a rotatable thrust bearing on each pin for supporting the lower end of the spring thereon, a frame connected to said sleeves by transverse pivots, supporting members mounted on said frame to swing about longitudinally spaced transverse axes, a pair of traction wheels on each of said members, the wheels on each member being on opposite sides of the pivotal axis, said wheels being engageable with the bottom of said rail, a motor on said frame, and gearing connecting said motor to said traction wheels.

16. A tractor adapted to travel upon an overhead rail and comprising a pair of longitudinally spaced trucks having supporting wheels adapted to travel on the rail and vertical pins extending downwardly therefrom, a sleeve slidably and rotatably mounted on each pin, a coil spring on each pin for supporting the sleeve thereon, a rotatable thrust bearing on each pin for supporting the lower end of the spring thereon, a frame connected to said sleeves by transverse pivots, supporting members mounted on said frame to swing about longitudinally spaced transverse axes, a pair of traction wheels on each of said members, the wheels on each member being on opposite sides of the pivotal axis, said wheels being engageable with the bottom of said rail and having cylindrical peripheries of greater width than the rail, a motor on said frame, and gearing connecting said motor to said traction wheels.

17. A tractor adapted to travel upon an overhead rail and comprising a pair of longitudinally spaced trucks having supporting wheels adapted to travel on the rail and a vertical pin extending downwardly therefrom, a coil spring surrounding each pin, thrust bearings at the lower ends of the pins for supporting said springs, sleeves slidably and rotatably mounted on the pins and resting upon the upper ends of the springs thereon, a frame connected to said sleeves by transverse pivots, means for limiting the movements of said frame on said pivots, traction wheels carried by said frame and adapted to bear against the bottom of the rail, and means for driving said traction wheels.

18. A tractor for overhead carrier systems comprising a pair of longitudinally spaced trucks having wheels adapted to travel on a rail, a frame suspended from said trucks and connected thereto to swivel about vertical and transverse axes and for movement bodily in a vertical direction, means interposed between the trucks and frame for yieldably pressing the frame upwardly, a supporting member mounted on said frame to swing about a transverse axis, a shaft at the pivotal axis of said member, a pair of traction wheels carried by said member and adapted to bear against the under side of the rail, gears connected to said wheels to rotate therewith, a gear on said shaft meshing with the gears connected to the wheels, a motor on said frame, and means for driving said last mentioned gear from said motor.

19. A tractor for overhead carrier systems comprising a pair of longitudinally spaced trucks having wheels adapted to travel on a rail, a frame suspended from said trucks and connected thereto to swivel about vertical and transverse axes and for movement bodily in a vertical direction, means interposed between the trucks and frame for yieldably pressing the frame upwardly, a pair of spaced transverse shafts beneath the track, a member mounted to swing about the axis of each of said shafts, a pair of traction wheels carried by each of said members and adapted to bear against the bottom of the rail, a gear connected to each traction wheel to rotate therewith, a gear on each transverse shaft meshing with the gears of the wheels carried by the adjacent wheel supporting member, a gear on the frame meshing with the gears on said transverse shafts, a motor on the frame, and means for driving said last mentioned gear from said motor.

In testimony whereof, I hereunto affix my signature.

WILLIAM G. WEHR.